United States Patent [19]
Mallary

[11] Patent Number: 5,384,680
[45] Date of Patent: Jan. 24, 1995

[54] PERPENDICULAR ANISOTROPY IN THIN FILM DEVICES

[75] Inventor: Michael Mallary, Berlin, Mass.

[73] Assignee: Digital Equipment Corporation, Maynard, Mass.

[21] Appl. No.: 17,998

[22] Filed: Feb. 16, 1993

Related U.S. Application Data

[63] Continuation of Ser. No. 227,813, Aug. 3, 1988, abandoned.

[51] Int. Cl.⁶ .............................................. H02H 1/00
[52] U.S. Cl. ..................................... 360/126; 428/692
[58] Field of Search ................. 360/125, 126; 428/692

[56] References Cited

U.S. PATENT DOCUMENTS

| | | | |
|---|---|---|---|
| 3,880,602 | 4/1975 | Valin et al. | 29/195 |
| 3,947,889 | 3/1976 | Lazzari | 360/113 |
| 3,961,299 | 6/1976 | Lazzari et al. | 360/126 |
| 3,967,368 | 7/1976 | Brock et al. | 29/603 |
| 4,103,315 | 7/1978 | Hempstead et al. | 360/110 |
| 4,179,719 | 12/1979 | Imamura et al. | 360/112 |
| 4,228,473 | 10/1980 | Himuro et al. | 360/114 |
| 4,242,710 | 12/1980 | Hempstead et al. | 360/126 |
| 4,295,173 | 10/1981 | Romankiw et al. | 360/125 |
| 4,356,523 | 10/1982 | Yeh | 360/113 |
| 4,374,403 | 2/1983 | Oshima et al. | 360/113 |
| 4,413,296 | 11/1983 | Jeffers | 360/113 |
| 4,535,375 | 8/1985 | Mowry et al. | 360/113 |
| 4,564,877 | 1/1986 | Ezaki et al. | 360/114 |
| 4,566,050 | 1/1986 | Beam et al. | 360/113 |
| 4,604,670 | 8/1986 | Visser | 360/127 |
| 4,613,918 | 9/1986 | Kanai et al. | 360/113 |
| 4,626,946 | 12/1986 | Vinal | 360/113 |
| 4,639,811 | 1/1987 | Diepers et al. | 360/125 |
| 4,649,447 | 3/1987 | Huang et al. | 360/113 |
| 4,656,546 | 4/1987 | Mallory | 360/110 |
| 4,663,685 | 5/1987 | Tsang | 360/113 |
| 4,668,913 | 5/1987 | Vinal | 324/235 |
| 4,695,351 | 9/1987 | Mallary | 204/15 |
| 4,698,711 | 10/1987 | Vinal | 360/113 |
| 4,719,148 | 1/1988 | Stoppels et al. | 428/336 |

(List continued on next page.)

FOREIGN PATENT DOCUMENTS

| | | |
|---|---|---|
| 0154005 | 9/1985 | European Pat. Off. . |
| 56-163517 | 12/1981 | Japan . |
| 57-141013 | 9/1982 | Japan . |
| 57-164416 | 10/1982 | Japan . |
| 59-121611 | 7/1984 | Japan . |
| 61-229209 | 10/1986 | Japan . |

OTHER PUBLICATIONS

Vinal, (IBM Technical Disclosure Bulletin, vol. 26, No. 78, Dec. 1983).

Jeffers, "Magnetoresistive Transducer With Canted Easy Axis", IEEE Transactions on Magnetics, vol. Mag-15, No. 6, Nov. 1979, pp. 1628-1629.

(List continued on next page.)

Primary Examiner—Paul J. Thibodeau
Assistant Examiner—R. Follett
Attorney, Agent, or Firm—Fish & Richardson

[57] ABSTRACT

One aspect of the present invention relates to enabling rotational flux conduction through magnetic film devices by creating a magnetic film layer with anisotropy perpendicular to the plane of the film layer, the film deposited in sufficient thickness so that there is a rest state rotational conduction path in the plane of the film layer. Another aspect of the invention is to provide for flux spreading in a magnetic device having perpendicular anisotropy. One feature of the present invention enables forming perpendicularly oriented central domains in a magnetic device so that the path for conduction of signal flux by rotation remains open even for very narrow signal flux paths. Another feature of the invention is to orient at rest domain states of a magnetic device pole (or poles) perpendicular to two desired in-plane rotational flux travel directions. Another feature of the invention is to orient edge domains in this type of magnetic device into a plane where their relative widths do not impact substantially on rotational flux flow through the device for narrow track heads.

A preferred embodiment of the present invention includes at least one pole of a magnetic device, formed on a substrate, having a preferred at rest pole domain orientation perpendicular to the substrate plane.

26 Claims, 2 Drawing Sheets

U.S. PATENT DOCUMENTS

| | | | |
|---|---|---|---|
| 4,745,506 | 5/1988 | Nakamura | 360/122 |
| 4,750,072 | 6/1988 | Takagi | 360/126 |
| 4,803,580 | 2/1989 | Mowry | 360/113 |
| 4,816,947 | 3/1989 | Vinal et al. | 360/113 |
| 4,825,318 | 4/1989 | Hoo et al. | 360/121 |
| 4,891,725 | 1/1990 | Mowry | 360/113 |
| 4,912,584 | 3/1990 | Mallary et al. | 360/126 |

OTHER PUBLICATIONS

Oshiki, "A Thin-Film Head for Perpendicular Magnetic Recording", J. Appl. Phys. 53(3), Mar. 1982, pp. 2593–2595.

Potter, "Self-Consistent computer Calculations for Perpendicular Magnetic Recording", IEEE Transactions on Magnetics, vol. MAG-16, No. 5, Sep. 1980, pp. 967–972.

Shinagawa, "Simulation of Perpendicular Recording on Co–Cr Media With A Thin Permalloy Film-Ferrite Composite Head", J. Appl. Phys. 53(3), Mar. 1982, pp. 2585–2587.

Iwaski, "An Analysis for The Magnetization Mode For High Density Magnetic Recording", IEEE Transactions on Magentics, vol. MAG-13, No. 5, Sep. 1977, pp. 1272–1277.

Mallary et al., "Frequency Response of Thin-Film Heads With Longitudinal And Transverse Anisotropy", IEEE Transactions on Magnetics vol. 26, No. 5, Sep. 1990, pp. 1334–1336.

Mallary et al., "Three-Dimensional Transmission Line Model For Flux Conduction In Thin-Film Recording Heads", J. Appl. Phys. 67(9), May, 1990, 4863–4865.

Mallary et al., "Conduction of Flux At High Frequencies By A Charge Free Magnetization Distribution", IEEE Transactions on Magnetics, vol. 24, No. 6, Nov. 1988, pp. 2374–2376.

IEEE Transactions on Magnetics, vol. 24, No. 3, May 1988; "Micromagnetics of Laminated Permalloy Films", Slonczewski et al.

Brock et al., "Thin-Film Head Process", Nov. 1976, IBM Technical Disclosure Bulletin, vol. 19, No. 6.

T. Maruyama et al; A Yoke Magnetoresistive Head For High Track Density Recording; 1987 IEEE; pp. 2503–2505.

PERPENDICULAR ANISOTROPY IN THIN FILM DEVICES

This is a continuation of application Ser. No. 07/227,813, filed Aug. 3, 1988 now abandoned.

BACKGROUND OF THE INVENTION

The present invention relates to thin film magnetic devices having perpendicular anisotropy.

Magnetic devices, such as thin film recording heads, whether read, read/write, or write, are designed to have particular magnetic orientations, or domains, within the active regions of the device material. The static state of each of these domains can be configured as desired, by control of the manufacturing process. Performance is critically linked to domain formation, and, therefore, control can be exerted over device performance by controlling domain formation.

Conduction of flux, such as in a thin film magnetic head, is achieved by two mechanisms: domain wall motion and domain rotation. Domain wall motion results in flux being transmitted through a thin film head along the walls of a domain, or domains, the flux spreading out along the domain walls as the flux seeks to return to equilibrium. However, while domain wall motion facilitates conduction of flux at low frequencies, it is a poor vehicle for conduction of flux at high frequencies. Furthermore, defects in the material in a magnetic head can be the source of Barkhausen noise during conduction of flux by wall motion as the flux is perturbed by these defects. Such noise can result in erroneous readings of recorded data.

Conduction of flux by domain rotation may be achieved by configuring a series of neighboring domains axially aligned along parallel axes, where flux impinged upon the first domain at a given angle will cause the magnetization of that domain to rotate from its static orientation by that angle radially into and impinging upon the neighboring domain. Such rotation can be transmitted in a like manner along an axis of flux transmission by each neighboring domain of the series. Hence, flux can be conducted in the pole and through the yoke of a thin film head in a series of domain rotations.

The yoke enables conduction of flux through a transducer which produces electrical signals proportional to flux levels or the rate of change of flux. Where the yoke reluctance is high, a significant amount of flux will bypass the transducer, and thus the device output will be reduced.

Certain prior art devices, such as thin film heads, are commonly produced having an anisotropy (at rest domain orientation) parallel to the plane of the substrate and transverse to the signal flux axis. In heads of this type, as track width gets smaller (with the push for higher track density), the region of transverse magnetization, which can transmit flux by rotation, shrinks toward zero. This results from edge domains (longitudinally oriented flux closure regions) dominating the flux path and preventing conduction by rotation. The head will therefore exhibit high reluctance at high frequencies.

A further artifact in conventional recording heads having the above orientation is that even where flux is conducted by rotation, the flux cannot substantially spread as it travels longitudinally from the pole tip through the yoke, since domain rotation can conduct flux efficiently only in the in-plane longitudinal direction in such devices, the other available direction being out-of-plane and of high reluctance.

Further discussion of flux conduction mechanisms will be found in a copending application entitled: Flux Spreading Thin Film Magnetic Devices, U.S. Ser. 07/227,808, No. filed Aug. 3, 1988, now U.S. Pat. No. 5,089,334, and is incorporated herein by reference.

SUMMARY OF THE INVENTION

One aspect of the present invention relates to enabling rotational flux conduction through magnetic film devices by creating a magnetic film layer with anisotropy perpendicular to the plane of the film layer, the film layer deposited in sufficient thickness so that there is a rest state rotational conduction path in the plane of the film layer.

One feature of the present invention enables forming perpendicularly oriented central domains in a magnetic device so that the path for conduction of signal flux by rotation remains open even for very narrow signal flux paths.

Another feature of the invention is to orient at rest domain states of a magnetic device pole (or poles) perpendicular to two desired in-plane rotational flux travel directions.

Another feature of the invention is to orient edge domains in this type of magnetic pole into a plane where their relative widths do not impact substantially on rotational flux flow through the pole for narrow track heads.

Another aspect of the invention is to provide for flux spreading in a magnetic device having perpendicular anisotropy.

A preferred embodiment of the present invention includes at least one layer of a magnetic device, formed on a substrate, having a preferred at rest pole domain orientation perpendicular to the substrate plane.

Other advantages and features will become apparent from the following description of the preferred embodiment and from the claims.

DESCRIPTION OF PREFERRED EMBODIMENT

We first briefly describe the drawings.

Figure 1:
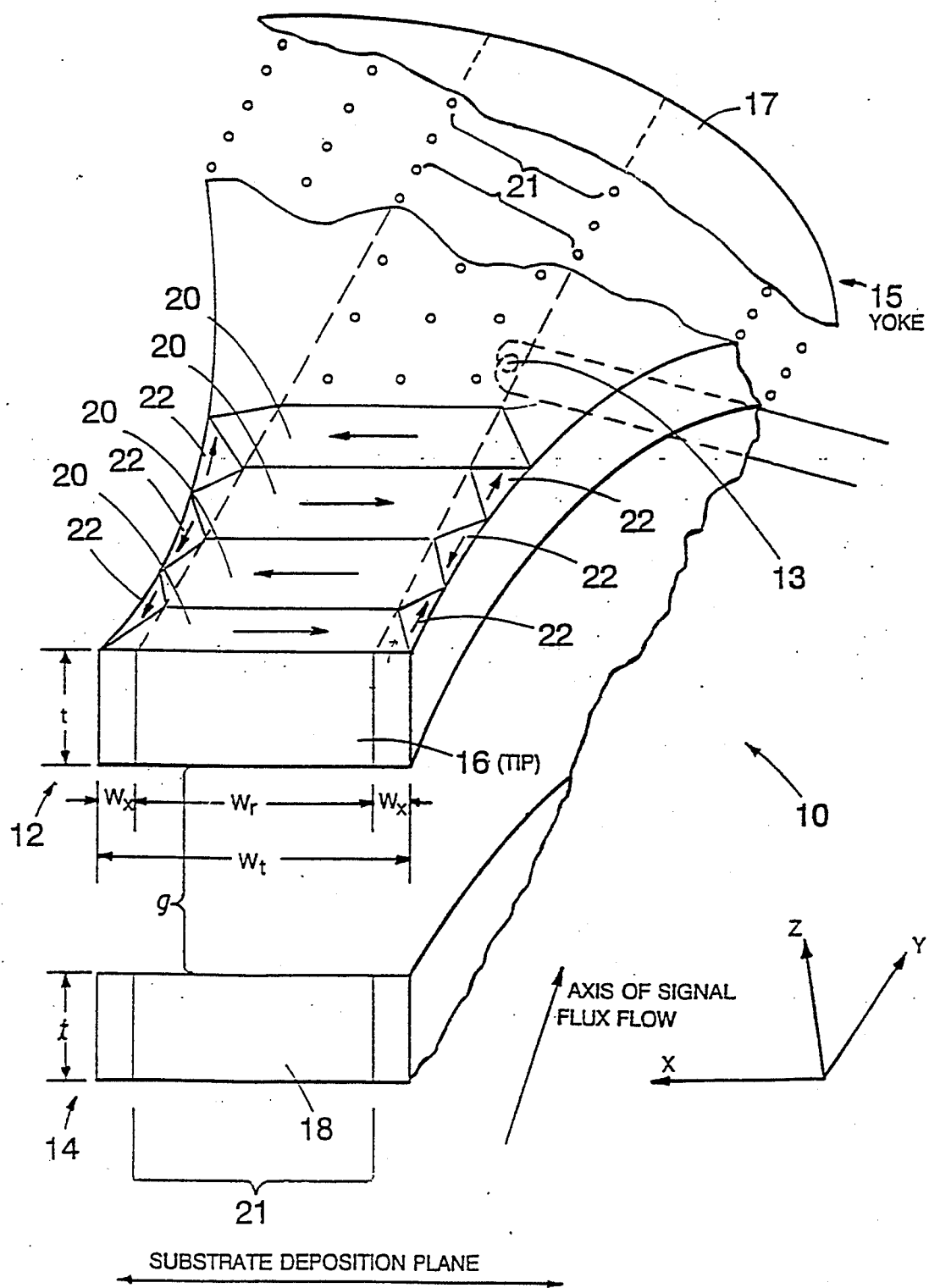
FIG. 1 is a perspective view of a conventional two pole magnetic recording head.

FIG. 1 is a perspective view from a magnetic recording medium (not shown) looking into the pole tips 16, 18 of a conventional two pole magnetic recording head 10. Pole tips 16, 18, of respective poles 12, 14, are shown exposed to the medium, each pole having a thickness t at its tip. As manufactured, each pole of such conventional device typically has a center region 21 defined by a plurality of transverse domains 20, all aligned along common parallel axes perpendicular to the axis of signal flux flow. The rest state magnetic orientation of each domain 20 is as indicated by the arrow within each such domain, and lies in the X-axis. This transverse orientation will facilitate rotational flux conduction, where flux will be propagated serially through adjacent domains 20 as it flows toward the rear 17 of yoke section 15 along the longitudinal Y-axis. The Z-axis is out of plane and is therefore a high reluctance path. An inductive transducer 13 is shown schematically in the yoke midsection where it will be capable of sensing or inducing signal flux flow.

On either side of center region 21, in the transverse direction, are edge domains 22. Each of these edge domains has a width $W_x$. They are oriented longitudinally as indicated by the arrow within each such domain. The domains 22 do not facilitate conduction by rotation, but rather act as closure domains in conjunction with adjacent domains 20 and also act to reduce rotational conduction efficiency.

Poles 12 and 14 are separated by a gap layer g, which in FIG. 1 is shown disproportionately large. It will be appreciated by those skilled in the art that gap g ordinarily would take the form of an insulating material such as $Al_2O_3$, laid down as part of a multistep growth process of forming a plurality of heads 10 upon a substrate. A typical gap width range might be 0.2 to 1.0 microns.

During recording of data by head 10 upon the recording medium, a track of oriented magnetization will be created having a width which is defined by the operational width $W_t$ of head 10. Furthermore, as shown in FIG. 1, track width $W_t$ will be understood as the sum of undesired edge domain 22 width $2W_x$ (i.e., $W_x+W_x$) and desired central region width $W_r$.

During the read cycle, at high frequencies, the signal from the track will be conducted from tip to yoke only in the central transversely oriented region $W_r$ of head 10. As recording of data increases, track width is driven smaller. However, as the track width $W_t$ is density, the width $W_r$ of central region 21 reduces by reduced by some given proportion to achieve higher track an even greater proportion toward zero. Thus rotational conduction is driven toward zero as track width narrows in conventional heads.

Figure 2:
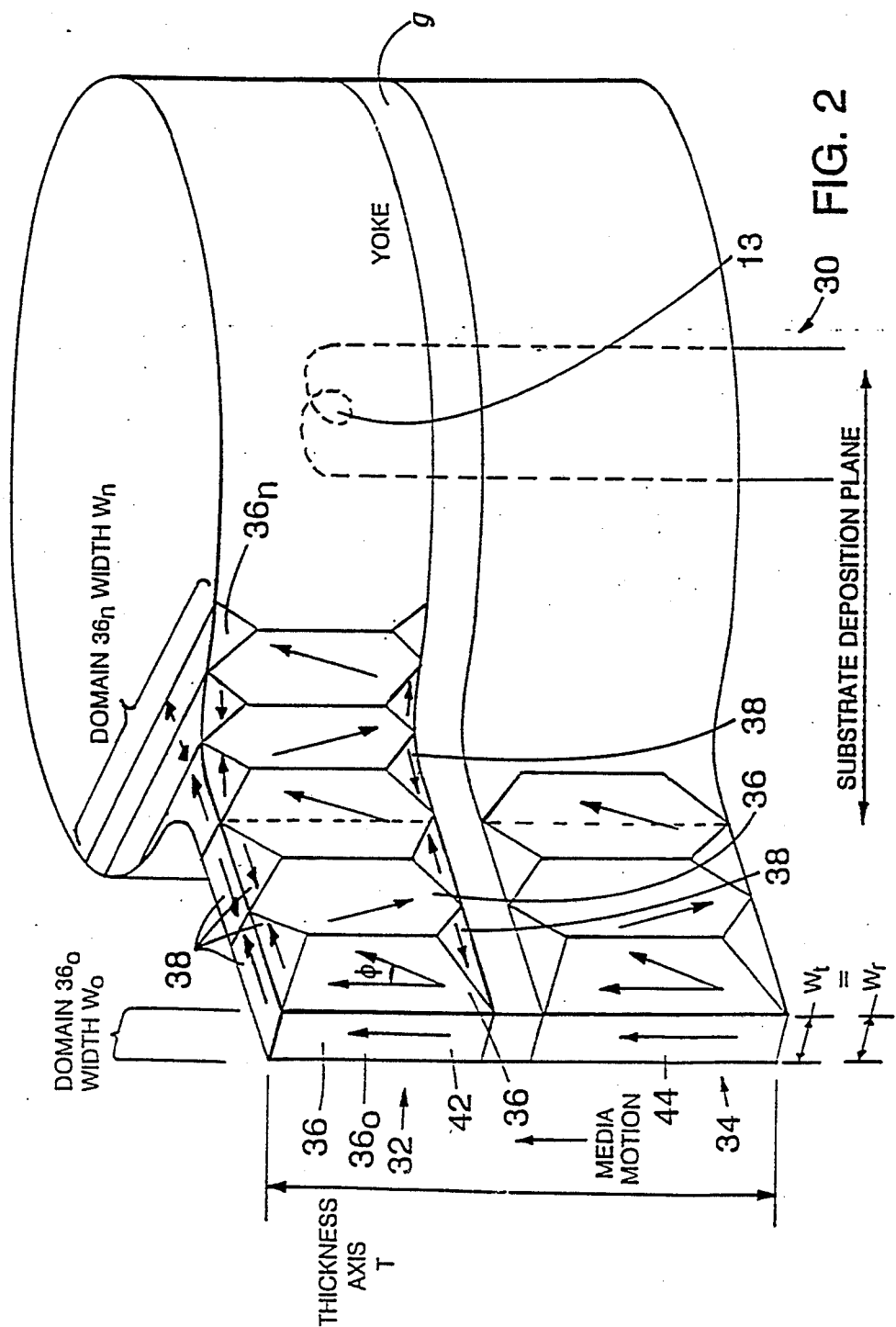
FIG. 2 is a perspective view of a thin film device incorporating a preferred embodiment of the present invention.

In the preferred embodiment of the present invention, shown in FIG. 2, a thin film magnetic device, such as a recording head 30, has two poles 32 and 34. The poles are formed, one on top of the other, parallel to the substrate deposition plane in the direction of film thickness axis T, separated by gap layer g. Pole 32 is configured having a plurality of central domains 36. Pole 34 is similarly configured. These domains are anisotropically oriented perpendicular to the substrate deposition plane.

As a result of the configuration of FIG. 2, the desired central domain width $W_r$ becomes equal to track width $W_t$. Hence, width $W_t$ can be reduced substantially without concern for the perturbing effect of the $2W_x$ edge domain factor. Of course, edge domains are inherent in thin film heads, and edge domains 38 now will be seen located on the far interior or exterior edges of poles 32, 34. However, these edge domains will have been relegated by this configuration to the head thickness dimension (which is not critical to maintaining the rotational beam provided that the poles are of sufficient thickness) rather than width (which is critical). Hence, the head may be plated to sufficient thickness T, where the edge domains 38 at the far horizontal surfaces of the poles are small relative to central domains 36, and thus do not dominate flux conduction.

It will be further appreciated that domains 36 will have varying widths, spreading out from the narrow tip toward the center of the yoke. Hence, the width of domain $36_o$ at the pole tip will be less than the width $W_n$ of domain $36_n$ near the yoke midsection. Depending upon yoke configuration, domains 36 may begin to reduce in width heading toward the very back of the yoke. This narrowing will not prevent conduction by rotation.

The transducer in this device will be associated with the yoke section, and is shown schematically as inductor 13o However, various transducer configurations would be operable within practice of the present invention.

Premagnetization of domains 36 is in the perpendicular (Z) direction (thickness), which leaves two horizontal (X, Y) directions (transverse and longitudinal) available for conduction by rotation in the planes of the poles. This has the additional advantage of facilitating flux spreading in the yoke, since both transverse and longitudinal travel components are available in-plane for flux movement.

In operation of the device of FIG. 2, signal flux from the medium interacts with the head pole tips 42, 44. Then, sequentially, each domain 36 reacts by rotating by an angle phi, thus propagating the signal flux down to the yoke of the device. This avoids the defects of conduction by wall motion, by removing the perturbation of edge domains, suppressing unwanted Barkhausen noise, and also enables flux spreading.

In order to avoid edge domain dominance from the domains at the top and bottom surfaces of the poles, it is necessary to plate the film thicker than normal, perhaps about or greater than three microns. The gap g at the pole tips may be of conventional thickness. In regard to conventionally oriented thin film heads, the ideal track width at which it pays to utilize the present invention is defined at the point where the width $W_t$ is almost equal to $2W_x$ (i.e., $W_r$ and the rotational signal flux path are approaching zero).

MANUFACTURING

In a dry vacuum deposition approach, the perpendicularly oriented layer (or layers) can be deposited on a wafer substrate by placing the wafer in a perpendicularly oriented magnetic field during deposition. The perpendicularly oriented magnetic field can be supplied by coils or by the magnetron target magnets of a sputtering machine, for example. Alternatively, orientation can be accomplished by growing the film with a crystal orientation that places a crystallographically oriented axis in the perpendicularly oriented direction. Another approach includes the steps of depositing a pole with negative magnetostriction and tensile stress such that magnetic anisotropy is induced in the perpendicular direction.

After the first pole is laid down, then a gap layer (non-magnetic) can be deposited. For dry deposition, it is convenient to use a ceramic. After each pole is deposited, the yoke and the transducer may be formed by means of a masked ion milling process.

For wet processing, each pole layer is deposited through a plating mask in a bias field to establish appropriate magnetic domain orientation. The non-magnetic layer can be plated if it is a metal, for example Ni-P, Au, Cu, etc. If a ceramic is used for the buffer layer, then this must be sputtered after the mask has been removed. The structure is now ready to receive the next magnetic pole, whereupon a seed layer and mask will be laid down, and the pole will be plated thereon.

A problem with the technology described above resides in that any exposure to very high temperatures (for example, greater than 200° C. for greater than half an hour for NiFe or NiFeCo poles) will degrade the induced anisotropy obtained by depositing in a field.

This sensitivity can be overcome by annealing at high temperatures in a strong perpendicular field.

Pole materials which may be used in the above processes including alloys of nickel, iron and cobalt, and magnetic garnet and magnetic ferrite crystals, to name a few alternatives Other embodiments are within the following claims.

What is claimed is:

1. A method for conducting signal flux by rotation in a magnetic structure that is generally disposed in a plane, comprising the steps of
   providing the magnetic structure with a relatively narrow end region extending along a longitudinal axis in the plane of the structure to a relatively wider base region,
   providing said end region and said base region of said structure with a magnetic rest state orientation,
   arranging said magnetic rest state orientation in said end region and said base region transverse to said plane to provide a plurality of paths each of which is generally disposed in said plane for conducting said signal flux by rotation of said magnetic rest state orientation, and
   applying said signal flux to said end region transversely to said magnetic rest state orientation to cause said end region to conduct said flux by rotation in a first one of said paths along said longitudinal axis to said base region and to cause said base region to conduct said flux by rotation in at least a second one of said paths that is disposed transversely to said longitudinal axis, so that said signal flux spreads away from said longitudinal axis as said signal flux conducts in said base region.

2. The method of claim 1 wherein said structure includes at least one other path for conducting flux other than by rotation, and further comprising providing said structure with a thickness selected to cause said signal flux to follow said at least one of said plurality of paths for conducting signal flux by rotation preferentially to said other path.

3. The method of claim 2 wherein said step of arranging said rest state orientation causes a first plurality of magnetic domains to be formed in a central region of said structure and a second plurality of magnetic domains to be formed in said structure, said first magnetic domains being orientated perpendicularly to upper and lower surfaces of said structure to provide said path for conducting signal flux by rotation, and further comprising the step of locating said second domains adjacent to said upper and lower surfaces and orienting said second domains parallel to said surfaces.

4. The method of claim 2, wherein said structure is an iron alloy.

5. The method of claim 2, wherein said structure is a nickel alloy.

6. The method of claim 2, wherein said structure is a cobalt alloy.

7. The method of claim 2, wherein said structure is a magnetic garnet.

8. The method of claim 2, wherein said structure is a magnetic ferrite.

9. The method of claim 2, wherein said structure is a soft magnetic film.

10. The method of claim 1 wherein said step of arranging said rest state orientation comprises forming a plurality of magnetic domains oriented perpendicularly to said plane to provide said paths for conducting signal flux by rotation.

11. The method of claim 10 further comprising forming a second plurality of magnetic domains formed in said structure, locating said second domains adjacent to upper and lower surfaces of the structure, and orienting said second domains parallel to said surfaces.

12. The method of claim 10 wherein said step of arranging causes a second plurality of magnetic domains oriented along one of said plurality of paths to be formed, said second domains defining a path for conducting flux other than by rotation, and further comprising providing said structure with a thickness selected to cause said signal flux to conduct along said magnetic domains oriented perpendicularly to said plane preferentially to conducting along said second domains.

13. The method of claim 12 wherein said thickness is selected to cause said magnetic domains oriented perpendicularly to said plane to be larger than said second domains.

14. The method of claim 1 further comprising arranging said rest state orientation to be substantially perpendicular to said structure.

15. The method of claim 1 further comprising arranging said magnetic at rest orientation so that said second path is perpendicular to said first path.

16. The method of claim 15 further comprising arranging said rest state orientation to be substantially perpendicular to said structure.

17. The method of claim 1 further comprising forming said structure as a thin-film layer configured to provide a pole for a magnetic head.

18. The method of claim 17 further comprising providing a transducer coupled to said layer for generating said signal flux in said layer.

19. The method of claim 17 further comprising providing a transducer coupled to said layer for detecting said signal flux conducting in said layer.

20. The method of claim 1 further comprising providing a second said layer and coupling said second layer to the first mentioned layer to provide a multiple pole magnetic head.

21. The method of claim 20 further comprising providing a transducer coupled to at least one of said layers for generating said signal flux therein.

22. The method of claim 20 further comprising providing a transducer coupled to at least one of said layers for detecting said signal flux conducting therein.

23. The method of claim 1 further comprising configuring said structure as a pole of magnetic head with said end region forming a tip of said pole having a selected width and said base region forming a yoke of said pole.
   said step of arranging said rest state orientation comprising forming a plurality of magnetic domains oriented perpendicularly to said plane to provide said paths for conducting signal flux by rotation, and
   arranging said structure so that one of said magnetic domains is disposed over said selected width of said tip.

24. The method of claim 23 wherein said step of arranging causes a second plurality of magnetic domains oriented along said first one of said paths to be formed, said second domains defining a path for conducting flux other than by rotation, and further comprising providing said structure with a thickness selected to cause said signal flux to conduct along said magnetic domains oriented perpendicularly to said plane preferentially to conducting along said second domains.

25. The method of claim 1 wherein said step of arranging said rest state orientation comprises forming a plurality of magnetic domains oriented perpendicularly to said plane to provide said paths for conducting signal flux by rotation and causes a second plurality of magnetic domains oriented along at least one of said paths to be formed, said second domains defining a path for conducting flux other than by rotation, and further comprising providing said structure with a thickness selected to cause said signal flux to conduct along said magnetic domains oriented perpendicularly to said plane preferentially to conducting along said second domains.

26. The method of claim 25 wherein said thickness is selected to cause said magnetic domains oriented perpendicularly to said plane to be larger than said second domains.

* * * * *

UNITED STATES PATENT AND TRADEMARK OFFICE
CERTIFICATE OF CORRECTION

PATENT NO. : 5,384,680
DATED : January 24, 1995
INVENTOR(S) : Michael Mallary

It is certified that error appears in the above-indentified patent and that said Letters Patent is hereby corrected as shown below:

Title page, item [56]
In the References Cited section, Other Publications, in the Vinal reference, replace "78" with --7B--.

Col. 2, line 7, replace "07/227,808, No." with --No. 07/227,808--.

Col. 3, line 32, after "track" insert --density, the width $W_r$ of central region 21 reduces by--.

Col. 4, line 5, replace "13o" with --13.--.

Col. 6, claim 20, line 40, replace "first mentioned" with --first-mentioned--.

Col. 6, claim 23, line 51, replace "pole." with --pole,--.

Signed and Sealed this

Ninth Day of May, 1995

Attest:

BRUCE LEHMAN

*Attesting Officer*     *Commissioner of Patents and Trademarks*